(12) United States Patent
Hustava et al.

(10) Patent No.: US 11,163,049 B2
(45) Date of Patent: Nov. 2, 2021

(54) ULTRASONIC SENSOR WITH ECHO MAGNIFICATION

(71) Applicant: SEMICONDUCTOR COMPONENTS INDUSTRIES, LLC, Phoenix, AZ (US)

(72) Inventors: Marek Hustava, Bratislava (SK); Michal Navratil, Pustimer (CZ); Pavel Kostelnik, Bordovice (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 223 days.

(21) Appl. No.: 16/530,693

(22) Filed: Aug. 2, 2019

(65) Prior Publication Data

US 2020/0326415 A1 Oct. 15, 2020

Related U.S. Application Data

(60) Provisional application No. 62/832,017, filed on Apr. 10, 2019.

(51) Int. Cl.
*G01S 7/529* (2006.01)
*G01S 15/93* (2020.01)
*G01S 15/931* (2020.01)

(52) U.S. Cl.
CPC ............ *G01S 7/529* (2013.01); *G01S 15/931* (2013.01)

(58) Field of Classification Search
CPC ......... G01S 7/529; G01S 15/931; G01S 7/527
USPC .......................................................... 367/87
See application file for complete search history.

(56) References Cited

U.S. PATENT DOCUMENTS

| 5,793,326 A | 8/1998 | Hofele |
| 5,793,704 A | 8/1998 | Freger |
| 5,974,379 A * | 10/1999 | Hatanaka ............ G10L 19/025 704/225 |

(Continued)

FOREIGN PATENT DOCUMENTS

| DE | 102013226085 B3 | 3/2015 |
| DE | 102017103275 A1 | 8/2018 |

(Continued)

OTHER PUBLICATIONS

Marek Hustava et al., "Detection of Noise-Induced Ultrasonic Sensor Blindness," U.S. Appl. No. 16/254,882, filed Jan. 23, 2019, 29 pages.

*Primary Examiner* — Daniel L Murphy
(74) *Attorney, Agent, or Firm* — Ramey & Schwaller, LLP

(57) ABSTRACT

Sensors, sensor controllers, and sensor control methods may employ an echo-magnification technique to improve threshold-based echo detection. In one illustrative embodiment, a sensor controller includes: a transmitter, a receiver, and a processing circuit coupled to the transmitter and to the receiver. The transmitter drives a piezoelectric element to generate acoustic bursts. The receiver senses a response of the piezoelectric element to echoes of each acoustic burst. The processing circuit is operable to apply echo-detection processing to the response by: identifying an interval of the response representing at least a portion of a potential echo; deriving a modified response from the response by selectively magnifying the response during said interval; and using the modified response to detect an echo.

23 Claims, 3 Drawing Sheets

(56) References Cited

U.S. PATENT DOCUMENTS

| | | |
|---|---|---|
| 10,234,549 B2 | 3/2019 | Suchy et al. |
| 10,345,445 B2 | 7/2019 | Hustava et al. |
| 2019/0079173 A1 | 3/2019 | Kutej et al. |
| 2019/0079174 A1 | 3/2019 | Kutej et al. |
| 2020/0271767 A1* | 8/2020 | Hustava ................. G01S 7/527 |

FOREIGN PATENT DOCUMENTS

| | | |
|---|---|---|
| FR | 3036809 | 12/2016 |
| WO | 2009108786 A1 | 9/2009 |

* cited by examiner

FIG. 4B
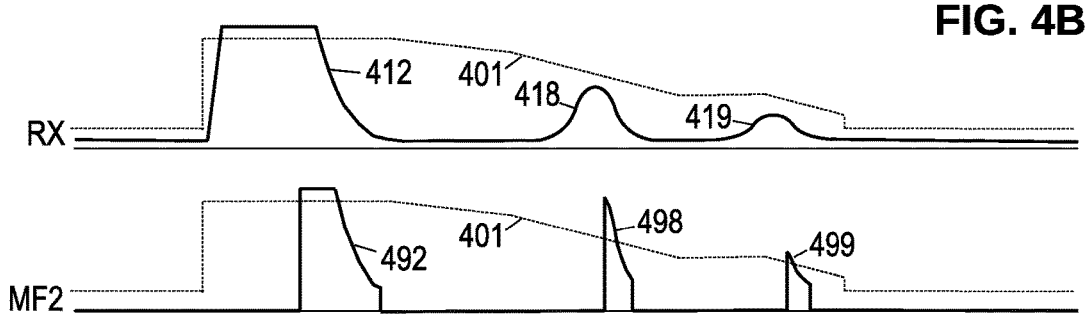
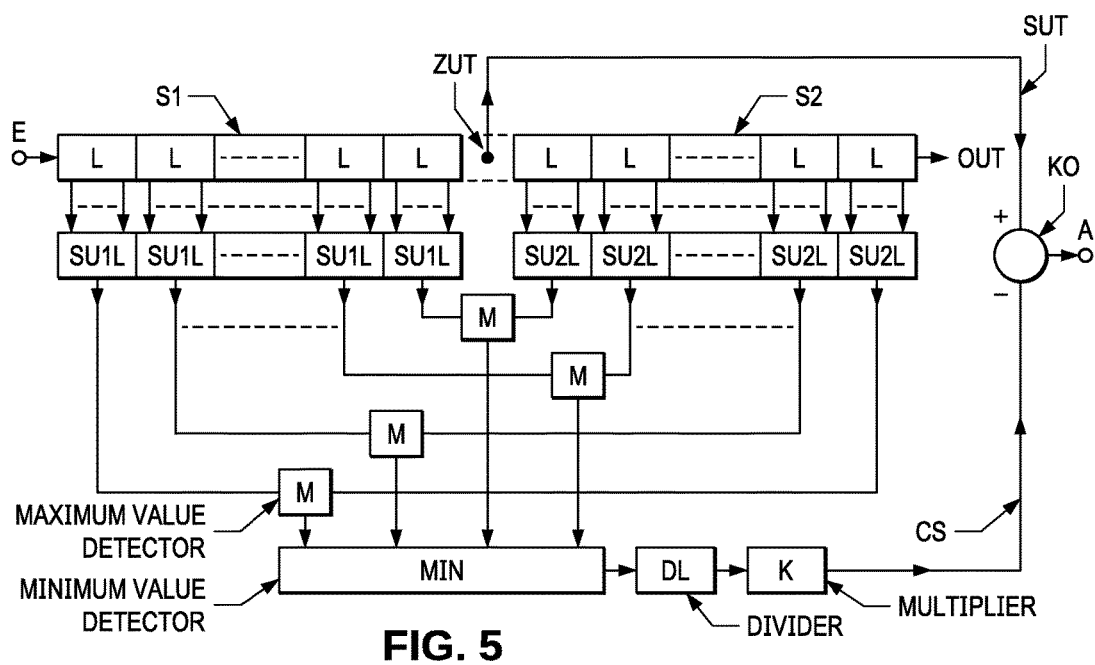
FIG. 5
FIG. 6
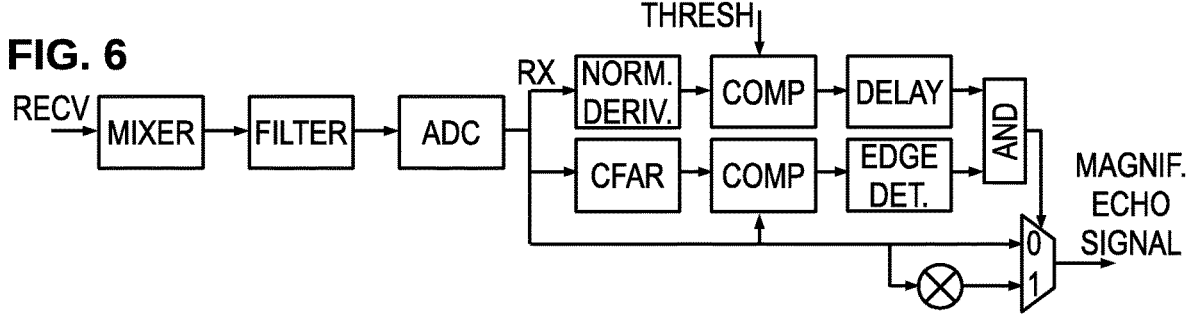

ULTRASONIC SENSOR WITH ECHO MAGNIFICATION

CROSS-REFERENCE TO RELATED APPLICATIONS

This application claims the benefit of U.S. Provisional Patent Application No. 62/832,017, filed on Apr. 10, 2019, the entire contents of which is incorporated herein by reference.

BACKGROUND

Modern cars are routinely equipped with arrays of ultrasonic sensors to monitor distances between the car and any nearby persons, pets, vehicles, or obstacles. Due to environmental "noise" and safety concerns, each of the sensors may be asked to provide tens of measurements each second while the car is in motion. Existing echo-detection techniques often employ variable thresholds in an effort to account for the gradual falloff of echo intensity with travel time. However, noise levels and attenuation can vary significantly in different environments, and even seemingly small differences, such as the presence or absence of a curb, or even the difference between paved and gravel surfaces, can significantly change the characteristic reflection of a pole, bollard, or other slim obstacle, making such detection techniques potentially vulnerable to failure unless augmented by computationally intensive adaptation of the detection templates to the environment. Such detection techniques may continue to be specified as a product requirement despite this shortcoming.

SUMMARY

Accordingly, there are disclosed herein various sensors, sensor controllers, and sensor control methods employing an echo-magnification technique to improve threshold-based echo detection. In one illustrative embodiment, a sensor controller includes: a transmitter, a receiver, and a processing circuit coupled to the transmitter and to the receiver. The transmitter drives a piezoelectric element to generate acoustic bursts. The receiver senses a response of the piezoelectric element to echoes of each acoustic burst. The processing circuit is operable to apply echo-detection processing to the response by: identifying an interval of the response representing at least a portion of a potential echo; deriving a modified response from the response by selectively magnifying the response during said interval; and using the modified response to detect an echo.

In an illustrative method embodiment, a piezo-electric based sensor is operated by: driving a piezoelectric transducer to generate a burst of acoustic energy during an actuation interval; during a measurement interval following the actuation interval, obtaining a response of the piezoelectric transducer; and processing the response to sense echoes of the burst. The processing includes: identifying an interval of the response representing at least a portion of a potential echo; deriving a modified response from the response by selectively magnifying the response during said interval; and using the modified response to detect an echo.

Each of the foregoing embodiments may be employed together with any one or more of the following optional features: 1. identifying an interval includes: comparing the response to an adaptive threshold to produce a comparison signal; and detecting an edge in the comparison signal. 2. said processing further includes deriving the adaptive threshold from the response signal using a constant false alarm rate (CFAR) process. 3. said identifying further includes comparing an estimated derivative to a threshold. 4. the interval corresponds to a rising edge of an echo pulse. 5. the interval corresponds to a falling edge of an echo pulse. 6. selectively magnifying includes multiplying by a scale factor. 7. selectively magnifying includes applying a non-linear function to the response during said interval. 8. selectively magnifying includes reducing the response outside of said interval. 9. the echo is detected by comparing the modified response to a predetermined threshold template.

BRIEF DESCRIPTION OF THE DRAWINGS

FIGS. 4A-4B are graphs of illustrative signals for an echo-scaling process.

FIG. 5 is an illustrative CFAR implementation.

FIG. 6 is a block diagram of an illustrative echo-scaling process.

DETAILED DESCRIPTION

It should be understood that the drawings and following description do not limit the disclosure, but on the contrary, they provide the foundation for one of ordinary skill in the art to understand all modifications, equivalents, and alternatives falling within the scope of the claims.

Figure 1:
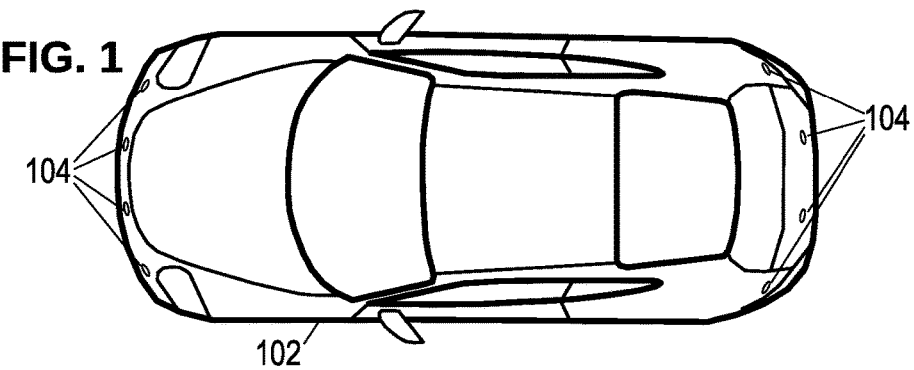
FIG. 1 is an overhead view of an illustrative vehicle equipped with parking-assist sensors.

As an illustrative usage context, FIG. 1 shows a vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors. The vehicle may employ the sensor arrangement for detecting and measuring distances to objects in the various detection zones, potentially using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms or transmissions to non-overlapping detection zones.

Figure 2:
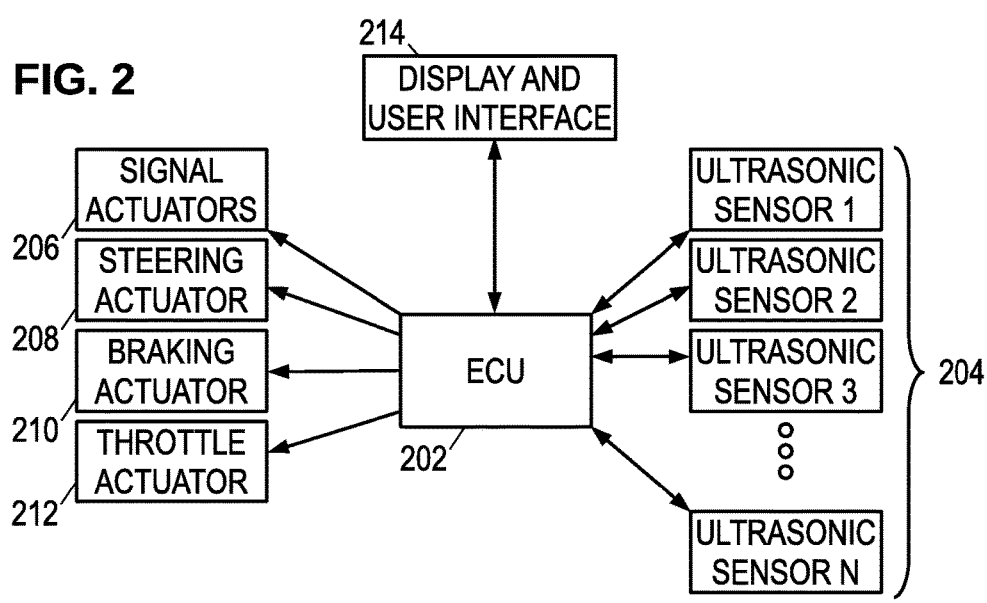
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

One potential sensor configuration is now described with reference to FIG. 3. (Other communication and power supply techniques such as those provided in the DSI3, LIN, and CAN standards, would also be suitable and are contemplated for use in accordance with the principles disclosed herein.) Besides the two power terminals (Vbat and GND) shown in the embodiment of FIG. 3, each of the illustrative ultrasonic sensors is only connected to the ECU 202 by a single input/output ("I/O" or "IO") line. The I/O line may be biased to the supply voltage (the "de-asserted" state) by a pull-up resistor when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command. [00s] The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which, with a suitably modulated local oscillator signal from a voltage controlled oscillator 307, drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element.

As used herein, the term "piezoelectric transducer" includes not only the piezoelectric element, but also the supporting circuit elements for tuning, driving, and sensing, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 amplifies the signal from the receive terminals. An optional mixer 309 multiplies the amplified receive signal with the local oscillator signal to downconvert the modulated signal to baseband before it is digitized and processed by a digital signal processor (DSP) 310 with an integrated analog-to-digital converter (ADC). Alternatively, the DSP 310 directly samples and processes the receive signals.

DSP 310 applies programmable methods to monitor the piezoelectric transducer during the transmission of a burst, and to detect any echoes and measure their parameters such as time-of-flight. Such methods may employ constant false alarm rate (CFAR) threshold determinations, derivative calculations, threshold comparisons, echo scaling, minimum intervals, noise level determinations, and other customizable techniques tailored for improving reliability and accuracy. The DSP 310 may further process the amplified receive signal to analyze characteristics of the transducer, such as resonance frequency and quality factor, and may further detect transducer fault states.

Commands received via the I/O line trigger the core logic 304 to operate the transmitter and receiver and to provide the measurement results to the ECU 202 via the I/O line or other interface standard. In addition to the echo measurements and transducer fault states that may be detected by the DSP 310, the core logic may monitor other sensor conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

Figure 4A:
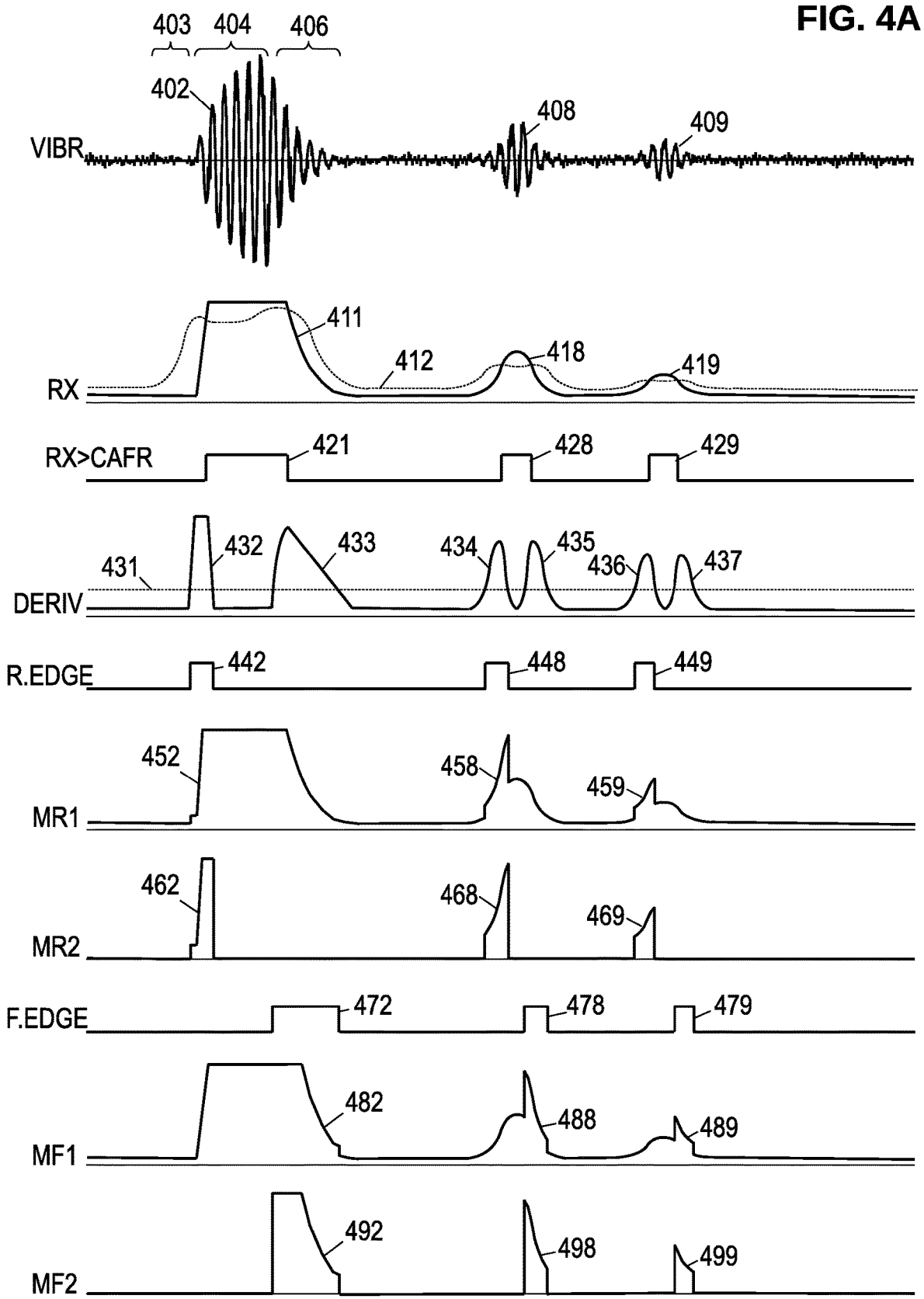

FIGS. 4A and 4B provide some illustrative signal graphs to aid in understanding the operation of the illustrative sensor embodiments. The operation of the piezoelectric transducer is here represented as a vibration signal VIBR representing mechanical oscillation of the piezoelectric element. (Note that the signals are not shown to scale. For example, the transmitted burst 402 may be orders of magnitude larger than the echoes 408, 409.) Electrically, the mechanical vibration of the piezoelectric element can be detected as a voltage or a current. The mechanical vibration amplitude increases as the controller 302 drives the transducer (the "driving stage" 404), then decreases after the driving operation is concluded (the "reverberation stage" 406). The controller 302 may employ active and/or passive damping to reduce the duration of the reverberation stage.

Figure 3:
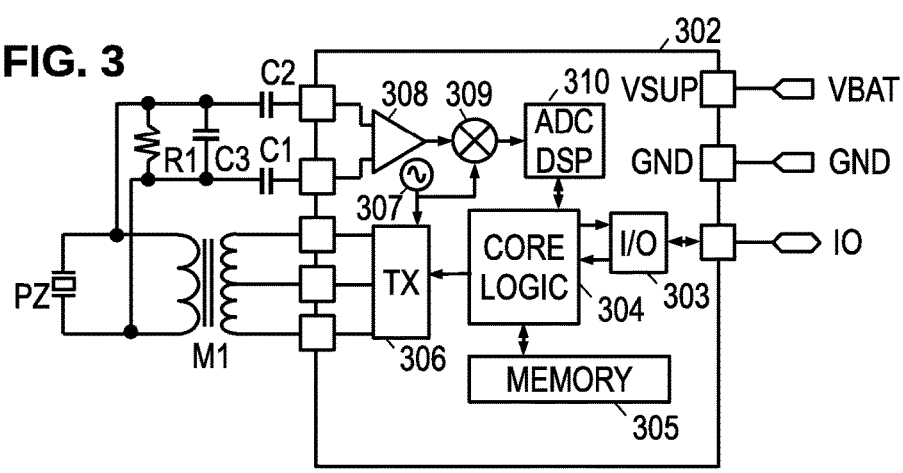
FIG. 3 is a circuit schematic of an illustrative parking-assist sensor.

In the sensor embodiment of FIG. 3, the vibration is detected as a downconverted, clamped, amplified version of the secondary voltage via amplifier 308. For explanatory purposes the RX signal illustrated in FIGS. 4A-4B is a (low-pass filtered) envelope of this downconverted, clamped, amplified voltage signal, but the amplified oscillatory signal can also be employed.

The sensor controller optionally measures a noise level during a pre-transmit period 403, to enable detection of transducer faults and/or environments that are too noisy for accurate echo measurements. The actuation of the transducer for the transmit burst typically causes the RX signal to saturate, yielding a transmit pulse 411. (In at least some implementations, internal voltage clamps on the receive terminals of the sensor controller prevent excessive voltages from reaching amplifier 308). The transmit burst overwhelms the receiver and prevents any meaningful echo measurements from being acquired during the actuation interval. Note that the actuation interval (the time during which the transmit burst causes the RX signal to exceed the detection threshold 412 (FIG. 4A) or 401 (FIG. 4B)) includes not only the drive stage 404 of the acoustic burst generation, but also a portion of the reverberation stage 406 of the acoustic burst. Once the receive signal falls below a detection threshold such as CFAR threshold 412 or predefined template 401, it becomes possible to detect echoes.

In FIG. 4A, the RX signal is compared with a dynamic threshold 412 which may be derived using a constant false alarm rate (CFAR) process. A number of CFAR variations exist offering different tradeoffs between performance and computational complexity, but in each case the processes are intended to keep the probability of detecting a false echo at a relatively constant level even in the presence of varying background noise. The CFAR threshold 412 increases in the presence of strong signals and/or noise, and decreases when only weak signals or noise are present.

When a comparator compares the RX signal to the CFAR threshold 412 in this example, it produces a comparison signal (RX>CFAR) having a pulse 421 to indicate the transmit burst and two later pulses 428, 429 to indicate the presence of potential echoes 418 and 419. In some contemplated embodiments, the RX signal may be magnified during assertions of the comparison signal. However, better performance is expected when the characteristic echo pulse shape is taken into account, i.e., with consideration of the rising and/or falling edges.

To confirm that the pulses in the comparison signal indicate echoes and not noise, the contemplated detection process further estimates a normalized derivative (DERIV) of the RX envelope signal. In at least some contemplated embodiments, the RX envelope is a digital signal. The sensor controller delays the RX signal by one sample interval and subtracts it from the undelayed RX signal to obtain an estimated derivative. The estimated derivative may be normalized by taking the absolute value of each difference and running it through two filters. A first, local moving average filter determines a sum or average of absolute differences within a small window, the size of which is optimized for accuracy vs. noise. A second, background filter determines a weighted sum of absolute differences over a window that is at least several times larger than that of the local filter. The second filter may be a recursive filter that provides exponential weighting of the past absolute differences. The normalized derivative (DERIV) is the ratio of the first (local) filter output to the second (background) filter output, and it is compared to a predetermined threshold 431. Each of the filters is preferably programmable to match the bandwidth of filters used for detecting potential echoes. The DERIV curve includes a peak 432 indicating the rising edge of transmit pulse 411, a peak 433 indicating the falling edge of pulse 411, peaks 434 and 435 indicating rising and falling edges of echo pulse 418, and peaks 436 and 437 representing rising and falling edges of echo pulse 419.

The normalized derivative may be compared to a predetermined derivative threshold 431 to enable detection of the echo pulse edges. In some alternative embodiments, the background filter is omitted and the filtered derivative signal (rather than the ratio) is compared to the predetermined threshold. The threshold may be fixed or time-dependent. A rising-edge (R.EDGE) signal is asserted when a pulse edge is detected in combination with a transition of the CFAR comparison from low to high. Thus, the rising edge signal contains a pulse 442 when the normalized derivative signal exceeds the threshold near an upward transition of the comparison signal (RX>CFAR). (Though not shown here, the normalized derivative signal may be delayed to enable detection of the upward transition before determining that the derivative signal exceeds the threshold.) Similarly, pulses 448 and 449 in the rising edge signal identify the rising edges of the echo pulses 418 and 419.

In some contemplated embodiments, the RX signal is magnified during assertions of the rising edge signal. In at least some embodiments, this magnification takes the form of multiplication by a constant scale factor. In FIG. 4A, a first magnified rising edge signal (MR1) shows the RX signal with the rising edges scaled by a factor of 2. The transmit pulse 411 has a steeper rising edge 452; echo pulse 418 has a magnified rising edge 458; and echo pulse 419 has a magnified rising edge 459. In certain variations, the constant scale factor is "windowed" or otherwise provided with smoother transitions from zero to maximum, so as to reduce abrupt transitions in the modified signal. In other variations, the scale factor is replaced with a power (e.g. a quadratic) or other nonlinear function to provide the desired magnification. In still other variations, the dynamic threshold is subtracted from the RX signal and the selective magnification is applied to the difference.

Some contemplated embodiments suppress the RX signal entirely outside of the magnification regions as shown by the second magnified rising edge signal MR2. In comparison with the first signal MR1, rising edges 452, 458, and 459 become pulses 462, 468, and 469, preventing noise or extraneous signal energy from interfering with the "sharpening" of the echoes.

The foregoing process can alternatively be applied to the falling edges rather than the rising edges. Falling edge signal (F.EDGE) has pulses 472, 478, 479 asserted where the derivative signal exceeds the threshold near downward transitions in the comparison signal. A first magnified falling edge signal MF1 shows the RX signal with transmit pulse 411 having a steeper falling edge 492, and echo pulses 418, 419 with magnified falling edges 488, 489. A second magnified falling edge signal MF2 further has the RX signal zeroed outside of the magnification regions, converting falling edges 482, 488, and 489 into falling edge pulses 492, 498, and 499. As before, a fixed scale factor or nonlinear function may be applied to the RX signal (or the difference between the RX signal and the threshold), with or without windowing to smooth the transitions.

Whether in the form shown by the MR1, MR2, MF1, MF2 graphs, or in one of the other forms disclosed herein, the echo pulses in the modified RX signals are at least partly magnified, either relative to the original RX signal, or relative to the non-echo portions of the modified RX signal. The non-echo portions of the original RX signal may also or alternatively be reduced, zeroed, or otherwise de-emphasized. The modified RX signal is then used in place of the original RX signal for subsequent processing for echo detection.

FIG. 4B compares the use of the original RX signal and the modified RX signal MF2 when a predetermined detection threshold template 401 is employed for echo detection. As the template 401 appears intended for use in environments noisier than the illustrative operating environment, it is set too high to detect the echoes 418, 419. But regardless of the sub-optimal nature of template 401, when it is employed to detect echoes in a modified RX signal, the magnified echoes (or magnified echo edges) ensure that the detection process performs as desired. The modified RX signals are expected to enhance performance in a wide range of existing echo detection techniques, whether performed by the sensor controller, a processing ASIC, or the ECU. The resulting time-of-flight determinations may be employed in the usual way for obstacle detection and monitoring.

FIG. 5 is an illustrative implementation of a CFAR process from U.S. Pat. No. 5,793,326 ("Hofele") which may be adapted for use by the sensor controller. A shift register having i blocks, each block having L samples of receive signal envelope RX, shifts to accept new sample blocks from input E. The block in the center is designated the cell under test ("ZUT"), while the blocks to the left of center form sub-register S1 and the blocks to the right form sub-register S2. A summing circuit determines for each block the sum of samples within that block. A set of maximum value detectors compares the sums pairwise, working outwards from the cell under test, each detector forwarding the maximum sum. A minimum value detector compares the maxima to determine the smallest one. A divider scales the smallest maximum by L or some other fixed value for normalization, before a multiplier K weights the normalized value, optionally adding an offset, to determine a CFAR threshold value. Comparator KD compares each of the samples in the cell under test to the threshold to determine whether a potential echo peak is present. As previously mentioned, a number of variations exist and would also be suitable for use, albeit with different tradeoffs between performance and computational complexity. One variation locates the ZUT at the right side of the shift register (for detecting rising edges) or at the left side of the shift register (to detect falling edges).

FIG. 6 is a block diagram of an illustrative echo magnification process that may be implemented by the sensor controller. A mixer downconverts the receive signal to baseband or near-baseband. A filter blocks the undesired frequencies from the downconversion process, and may further perform rectification and low-pass filtering to obtain the envelope of the receive signal. An analog-to-digital converter (ADC) digitizes the receive signal envelope, which is directed along three branches.

Along one branch, a derivation element ("Norm. Deriv.") determines the normalized derivative as discussed previously. A comparator compares the normalized derivative to a programmable threshold value, producing a binary comparator signal that is asserted when the threshold is exceeded. A delay element provides a predetermined delay before providing the comparator signal to an AND gate. In some implementations, the comparator signal must be asserted for at least a predetermined minimum interval, or else the assertion is blocked from reaching the AND gate.

Along a second branch, a CFAR element derives a CFAR threshold from the RX signal, the threshold optionally including a programmable offset. A comparator compares the RX signal to the CFAR threshold, producing an output signal that is asserted when the RX signal is above the threshold and deasserted otherwise. An edge detector detects downward transitions of the comparator output, upward transitions, or both, depending on the configuration of the sensor controller. In some implementations, the edge detector generates a fixed-length pulse to indicate the position of each edge.

A logical AND asserts an echo edge detection signal when both the RX signal crosses the CFAR threshold in the desired direction and the normalized derivative exceeds the derivative threshold. The AND element may be configured to generate a fixed length pulse to indicate when the inputs have been simultaneously asserted, or a variable length pulse that corresponds to a duration of the interval for which the derivative exceeds the threshold.

Along a third branch, the original RX signal is supplied to a multiplier and a first input of a multiplexer. The multiplier output is supplied to the other input of the multiplexer. The echo edge detection signal is supplied to the multiplexer to select between the inputs, causing the multiplexer to output the magnified RX signal when an echo edge is detected and an unmagnified (or alternatively, a zeroed) signal otherwise. The resulting modified RX signal is then forwarded for processing in accordance with an existing echo detection process. For example, the modified RX signal may be compared to a predetermined threshold template, and echoes may be identified where the modified RX signal exceeds the threshold.

Though the operations shown and described above are treated as being sequential for explanatory purposes, in practice the process may be carried out by multiple integrated circuit components operating concurrently and perhaps even speculatively to enable out-of-order operations. The sequential discussion is not meant to be limiting. These and numerous other modifications, equivalents, and alternatives will become apparent to those skilled in the art once the above disclosure is fully appreciated. It is intended that the following claims be interpreted to embrace all such modifications, equivalents, and alternatives where applicable.

What is claimed is:

1. A controller for a piezoelectric transducer, the controller comprising:
    a transmitter to drive a piezoelectric element to generate acoustic bursts;
    a receiver to sense a response of the piezoelectric element to echoes of each acoustic burst; and
    a processing circuit coupled to the transmitter and to the receiver, the processing circuit operable to apply echo-detection processing to said response, said processing including:
        identifying an interval of the response representing at least a portion of a potential echo;
        deriving a modified response from the response by selectively magnifying the response during said interval; and
        using the modified response to detect an echo.

2. The controller of claim 1, wherein said identifying an interval includes:
    comparing the response to an adaptive threshold to produce a comparison signal; and
    detecting an edge in the comparison signal.

3. The controller of claim 2, wherein said processing further includes deriving the adaptive threshold from the response signal using a constant false alarm rate (CFAR) process.

4. The controller of claim 2, wherein said identifying further includes comparing an estimated derivative to a threshold.

5. The controller of claim 1, wherein the interval corresponds to a rising edge of an echo pulse.

6. The controller of claim 1, wherein the interval corresponds to a falling edge of an echo pulse.

7. The controller of claim 1, wherein said selectively magnifying includes multiplying by a scale factor greater than unity.

8. The controller of claim 1, wherein said selectively magnifying includes applying a nonlinear function to the response during said interval.

9. The controller of claim 1, wherein said selectively magnifying includes reducing the response outside of said interval.

10. The controller of claim 1, wherein the echo is detected by comparing the modified response to a predetermined threshold template.

11. A method of operating a piezoelectric-based sensor, the method comprising:
 driving a piezoelectric transducer to generate a burst of acoustic energy during an actuation interval;
 during a measurement interval following the actuation interval, obtaining a response of the piezoelectric transducer; and
 processing the response to sense echoes of the burst, said processing including:
  identifying a potential echo interval of the response representing at least a portion of a potential echo;
  deriving a modified response from the response by selectively magnifying the response during said potential echo interval; and
  using the modified response to detect an echo.

12. The method of claim 11, wherein said identifying a potential echo interval includes:
 comparing the response to an adaptive threshold to produce a comparison signal; and
 detecting an edge in the comparison signal.

13. The method of claim 12, wherein said processing further includes deriving the adaptive threshold from the response signal using a constant false alarm rate (CFAR) process.

14. The method of claim 12, wherein said identifying further includes comparing an estimated derivative to a threshold.

15. The method of claim 11, wherein the potential echo interval corresponds to a rising edge of an echo pulse.

16. The method of claim 11, wherein the potential echo interval corresponds to a falling edge of an echo pulse.

17. The method of claim 11, wherein said selectively magnifying includes multiplying by a scale factor greater than unity.

18. The method of claim 11, wherein said selectively magnifying includes applying a nonlinear function to the response during said potential echo interval.

19. The method of claim 11, wherein said selectively magnifying includes reducing the response outside of said potential echo interval.

20. The method of claim 11, wherein the echo is detected by comparing the modified response to a predetermined threshold template.

21. A method of manufacturing a controller for a piezoelectric transducer, the method comprising:
 providing a transmitter to drive a piezoelectric element to generate acoustic bursts;
 creating a receiver to sense a response of the piezoelectric element to echoes of each acoustic burst; and
 coupling a processing circuit to the transmitter and to the receiver, the processing circuit operable to apply echo-detection processing to said response, said processing including:
  identifying an interval of the response representing at least a portion of a potential echo;
  deriving a modified response from the response by selectively magnifying the response during said interval; and
  using the modified response to detect an echo.

22. The method of claim 21, wherein said identifying an interval includes:
 comparing the response to an adaptive threshold to produce a comparison signal; and
 detecting an edge in the comparison signal.

23. The method of claim 22, wherein said processing further includes deriving the adaptive threshold from the response signal using a constant false alarm rate (CFAR) process.

* * * * *